UNITED STATES PATENT OFFICE.

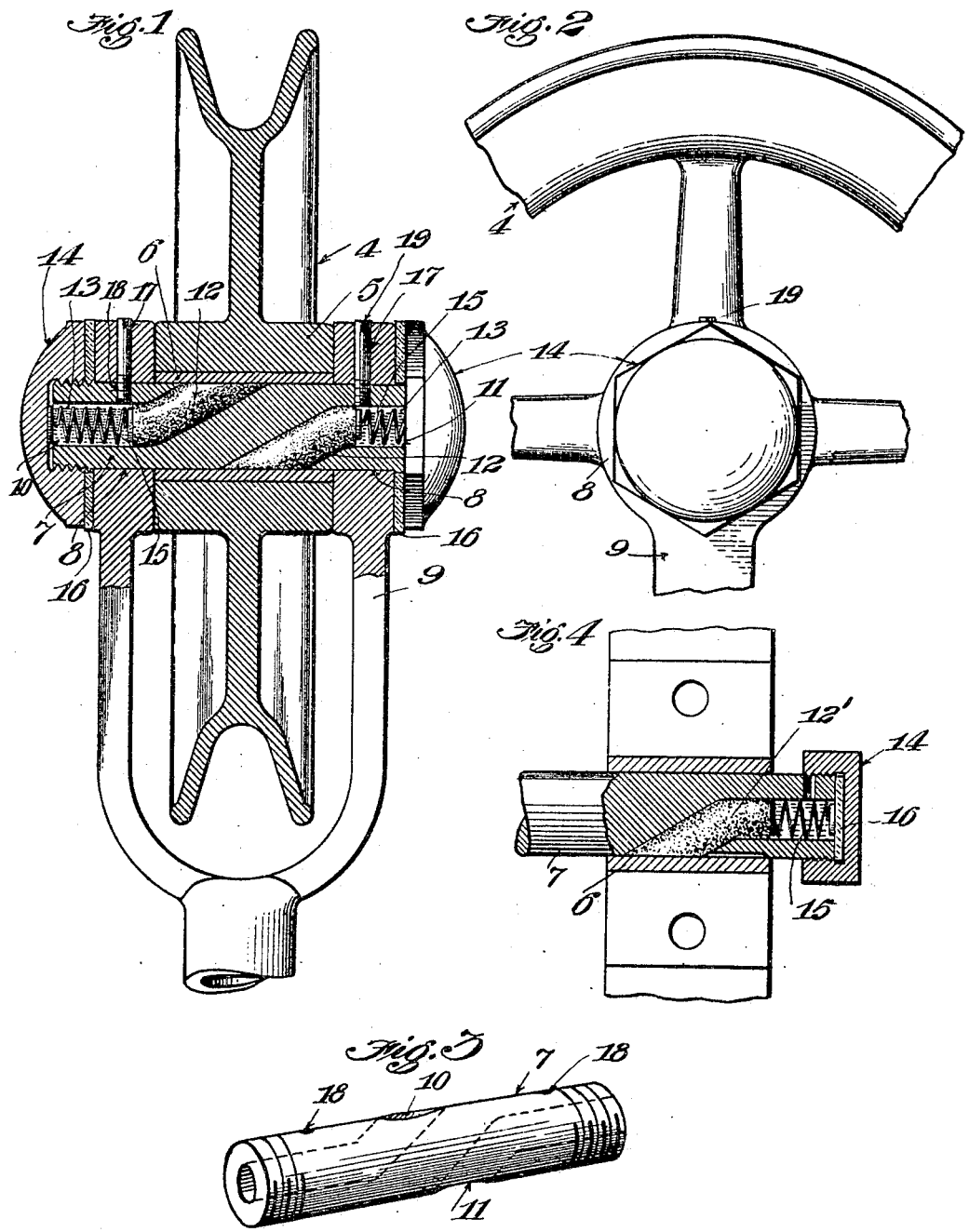

EDMUND A. STRAUSE, OF LOS ANGELES, CALIFORNIA, ASSIGNOR OF ONE-HALF TO G. E. HARPHAM, OF LOS ANGELES, CALIFORNIA.

SELF-OILING BEARING.

No. 799,020. Specification of Letters Patent. Patented Sept. 5, 1905.

Application filed April 6, 1905. Serial No. 254,210.

*To all whom it may concern:*

Be it known that I, EDMUND A. STRAUSE, a citizen of the United States, residing at Los Angeles, in the county of Los Angeles and State of California, have invented new and useful Improvements in Self-Oiling Bearings, of which the following is a specification.

My invention relates more particularly to self-oiling bearings for trolley-wheels, pulley-sheaves, and like structures, having one of the members movable and the other fixed; and it consists substantially in such features of construction, arrangements, and combination of parts, as will hereinafter be more particularly described.

For convenience in illustration I have in this instance shown my invention applied to a trolley-wheel. As ordinarily constructed a trolley-wheel is usually provided with some means of lubrication, in order to lessen the wear on the bearings or other movable parts and to make them run easier, and attempts have been made to obviate the frequent filling or supplying of the lubricant on account of the inconvenience and loss of time entailed. In some instances it has been usual to provide an oil-supply chamber around the hub or central bearing and allow the oil to flow or feed to the parts to be lubricated. In other instances it has been the practice to employ a tubular pin and feed the oil through ports in the pin to the parts to be lubricated. Both of the ways referred to fail to fully meet the requirement, because, in the first instance, the centrifugal force generated by the revolving wheel tends to force the lubricant outwardly and away from parts to be lubricated and at the same time delivering an excessive amount of the lubricant to the bearings when the wheel is at rest. In the second instance the reverse is the case, forcing an excessive amount to the bearings when the wheel is in motion.

Recognizing the inconvenience and disadvantages to be overcome, I have adapted a construction in which all the lubricating means are contained within channels provided in the axle. By this construction I prevent excessive lubrication and at the same time lubricate only when the wheel is in motion. Also by my construction the oil is more evenly and uniformly supplied to the bearings, thus doing away with the necessity of replenishing the oil-chambers at frequent intervals. Another advantage of this construction is that I am able to use wheels of usual construction without alterations of any kind.

In the accompanying drawings, Figure 1 is a partial vertical section through a trolley-wheel and its bearings. Fig. 2 is a partial side elevation of a trolley-wheel. Fig. 3 is a perspective view of the axle. Fig. 4 is a modified form in which my device is shown as applied to a revolving shaft mounted in fixed bearings.

Referring to the drawings, 4 represents a trolley-wheel of usual construction, having a hub 5 and a metallic bushing 6. The wheel is supported in the usual manner by the axle 7, which is mounted in bearings 8 of the harp 9. The axle is preferably channeled inwardly from both ends to a point near its center, whence they are carried outwardly, as at 10 and 11, to opposite sides of the axle. In the inner inclined end of these channels are placed wicks 12, of any suitable absorbent material, such as felt. These wicks convey the lubricant from the lubricant-chambers 13, which are formed by the outer ends of the channels, to the bearings. These lubricant-chambers are closed by hollow nuts 14, which screw on the ends of the axle. Interposed between the outer ends of the wicks and the inner face of the hollow nuts and in the lubricant-chambers are coiled springs 15, of light tension, which serves to keep the wicks always in contact with the bearing-surfaces of the wheel as the wick wears away. Interposed between these nuts and the harp is a metallic gasket 16, of any soft metal, which serves to form a tight joint when the nuts are screwed in place. Channels 17 in the harp and channels 18 in the axle provide means to feed the lubricating-oil to the chambers. Channels 18 are threaded for reception of screws 19, which close said channels and hold the axle against rotation. Instead of the wick pulverized graphite or other plastic absorbent material may be used.

In Fig. 4 I have shown my device applied to a revoluble shaft turning in fixed bearings or journals. The absorbent material 12' is pulverized graphite.

From the foregoing description it will be seen that a trolley embodying my construction and arrangement is compact in form, secure and strong, and, besides, has no projecting and interfering portions. It will also be seen that the same is simple in construction, as all the lubricating parts are contained within the axle, preventing any waste or excess of feeding of the lubricants, and every particle thereof is fully utilized. The lubricating-chambers may be increased in size, if desired.

Having described my invention, what I claim as new, and desire to secure by Letters Patent, is—

1. A self-oiling bearing consisting of an outer and an inner member one of which is revoluble, there being a channel extending from the outer end of the inner member and terminating within the outer member; absorbent means in said channel in contact with the outer member; means to close the outer end of said channel; means interposed between the channel-closure and absorbent means to keep said means in contact with the outer member.

2. A self-oiling bearing for trolley-wheels consisting of an axle having a channel extending from the outer end thereof to and through the sides of the axle within the hub of the wheel; absorbent means in the inner end of said channel, means for feeding said absorbent means and means to close the outer end of said channel and press against said feeding means.

3. A self-oiling bearing for trolley-wheels consisting of an axle having an internal channel extending from the outer end thereof to and through the side of the axle within the hub of the wheel; a wick in the inner end of said channel; means located in the outer end of said channel to keep the wick against the bearing and means to close the outer opening of said channel.

4. A self-oiling bearing for trolley-wheels consisting of an axle having a plurality of channels extending from the outer ends thereof to and through the side of the axle within the hub of the wheel; wicks in the inner ends of said channels, means to close the outer ends of said channels and means for feeding forward the wicks.

5. A self-oiling bearing for trolley-wheels consisting of an axle having a plurality of channels extending from the outer ends thereof to and through the sides of the axle within the hub of the wheel; wicks in the inner ends of said channels and means to close the outer ends of said channels; means interposed between said channel-closures and the outer wick ends to keep said wicks in contact with the bearing.

6. A self-oiling trolley comprising a harp having channels extending to the ends of the axles; an axle extending through said harp having channels extending from the ends and terminating at the outer edges within the wheel, and a short threaded channel in register with the channels in the harp and opening into the channels running from the ends; screws in said last channels and in the channels in the harp; a trolley-wheel revolubly mounted on said axle; nuts on the ends of said axle; absorbent material in the channels extending to the ends of the axles and springs between said material and said nuts.

7. The combination with a suitable support, of an axle and wheel journaled thereon, said axle having a channel bored through the end which extends to the wheel-bearing surface, the support and axle having registering channels communicating with the first-mentioned channel and a screw adapted to enter said registering channels and fastening the axle to the support.

In witness that I claim the foregoing I have hereunto subscribed my name this 31st day of March, 1905.

EDMUND A. STRAUSE.

Witnesses:
  G. E. HARPHAM,
  MYRTLE A. JONES.